(12) United States Patent
Kuribayashi et al.

(10) Patent No.: US 6,633,622 B2
(45) Date of Patent: Oct. 14, 2003

(54) REACTOR POWER OUTPUT MEASUREMENT DEVICE

(75) Inventors: Takuya Kuribayashi, Hitachi (JP); Toshiyuki Hirayama, Naka-gun (JP); Kazuhiko Ishi, Takahagi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/943,357

(22) Filed: Aug. 31, 2001

(65) Prior Publication Data

US 2002/0126790 A1 Sep. 12, 2002

(30) Foreign Application Priority Data

Dec. 13, 2000 (JP) .................................. 2000-378637

(51) Int. Cl.[7] .......................................... G21C 17/108
(52) U.S. Cl. ...................................... 376/254; 376/245
(58) Field of Search ................................ 376/216, 219, 376/254, 259, 245

(56) References Cited

U.S. PATENT DOCUMENTS

| | | | | |
|---|---|---|---|---|
| 3,932,211 A | * | 1/1976 | Loving, Jr. ................. | 376/254 |
| 4,255,234 A | * | 3/1981 | Neuner et al. .............. | 376/254 |
| 4,268,354 A | * | 5/1981 | Wassel et al. .............. | 376/254 |
| 5,787,138 A | * | 7/1998 | Ocieczek et al. .......... | 376/215 |
| 6,236,698 B1 | * | 5/2001 | Hirukawa et al. .......... | 376/255 |

FOREIGN PATENT DOCUMENTS

| | | | | |
|---|---|---|---|---|
| JP | 53064193 | * | 6/1978 | ................. 376/254 |
| JP | 54016093 | * | 2/1979 | ................. 376/254 |
| JP | 62119498 | * | 5/1987 | ................. 376/254 |
| JP | 10-199971 | | 7/1998 | ................. 376/254 |

* cited by examiner

Primary Examiner—Michael J. Carone
Assistant Examiner—Daniel Matz
(74) Attorney, Agent, or Firm—Crowell & Moring LLP

(57) ABSTRACT

A reactor power output measurement device measuring a neutron flux with a traversing incore probe (TIP) traversing in a vertical direction in a core of a reactor, and calibrating a detection sensitivity of a local power range monitor based on a measured neutron flux distribution in the axial direction inside the reactor, which is provided with an integrated control device 9 for transmitting control data to all of TIP drive control devices 13a through 13e and performing control/monitor of all of detector drive systems 17a through 17e. An integrated unit operation/monitor device 10 for operating/monitoring the integrated control device 9, and a TIP integrated controller 8 comprising an integrated unit input/output device 11 for inputting detection signals obtained from TIP detectors 18a through 18e to the integrated control device 9 via the integrated unit input/output device 11, and which switches to the integrated unit operation/monitor device 10 when the drive unit operation/monitor devices 15a through 15e suffer from failure.

5 Claims, 6 Drawing Sheets

REACTOR POWER OUTPUT MEASUREMENT DEVICE

FIELD OF THE INVENTION

The present invention relates to a reactor power output measurement device, which measures a neutron flux inside a nuclear reactor with a traversing incore probe, and which calibrates the detection sensitivity of a local power range monitor based on the measured neutron flux level in the axial direction inside the nuclear reactor.

DESCRIPTION OF THE RELATED ART

Generally, an output detection of a boiling water reactor is performed by a local power range monitor (hereinafter referred to as LPRM). However, because the LPRM is permanently constructed inside the nuclear reactor, the detector sensitivity changes. Therefore, during plant start-up at starting or after a scheduled check, the neutron flux inside the nuclear reactor is measured using a traversing incore probe (hereinafter referred to as TIP), and the detector sensitivity of the LPRM is calibrated.

As an example of the prior art, a technique is disclosed in Japanese Patent Laid-open No. 2000-28782. The TIP detector is extracted from the nuclear reactor when not in use, and is inserted to a guide tube inside the nuclear reactor when in use, and measures the power output by moving in the vertical direction inside the reactor core. However, when a drive control device of a TIP drive controller which controls a TIP detector drive system for moving the TIP detector suffers from failure, it becomes impossible to move the TIP detector so that the TIP detector cannot be extracted to the position of a chamber shield. Therefore, the TIP drive control unit is provided with an extraction circuit by an interlock circuit, so that the TIP detector could be extracted to the interior of the chamber shield manually using the extraction circuit, even when the drive control device of the TIP drive controller stops.

Even when an operation/monitor device of the TIP drive controller suffers from failure, it becomes possible to operate the TIP detector drive system, so that the TIP detector is extracted to the interior of the chamber shield manually.

Also, a neutron flux signal and a positional signal obtained from the TIP detector is recorded by a XY recorder.

SUMMARY OF THE INVENTION

However, in the prior art, the shortening of the plant start-up time by efficiently performing a backup function for the operation/monitor device of the TIP detector drive system, and recording/storing the measured data, are not fully discussed.

The problem for the present invention is to perform efficiently the backup function for the operation/monitor device of the TIP detector drive system, and the recording/storing of the measured data.

In order to solve the above-mentioned problem, the present invention provides a detector drive system of a traversing incore probe (TIP) traversing in a vertical direction in an incore of a reactor;
 a drive control unit including a drive unit operation/monitor means for operating and monitoring the TIP, and controlling the detector drive system; and
 a TIP integrated control unit connected to the drive control unit and including an integrated unit operation/monitor means for operating and monitoring the TIP;
 wherein operation is switched to the integrated unit operation/monitoring means when the drive unit operation/monitor means suffers from failure.

Also, the present invention provides an integrated unit operation/monitor means for operating and monitoring the TIP which is connected to the drive control unit including a drive unit operation/monitor means for operating and monitoring the TIP, and controlling the detector drive system;
 an integrated unit input/output means for inputting/outputting a neutron flux measured by the TIP;
 a TIP integrated control unit including an integrated control means for signal processing the measured neutron flux;
 a data processing terminal and a printer connected to the TIP integrated control unit; and
 a memory means for memorizing/storing the measured neutron flux;
 wherein the measured neutron flux and the neutron flux distribution in the axial direction inside the reactor are memorized/stored, displayed and recorded using the device.

DETAILED DESCRIPTION OF PREFERRED EMBODIMENTS

The embodiment of the present invention will be described below with reference to the drawings.

Figure 1:
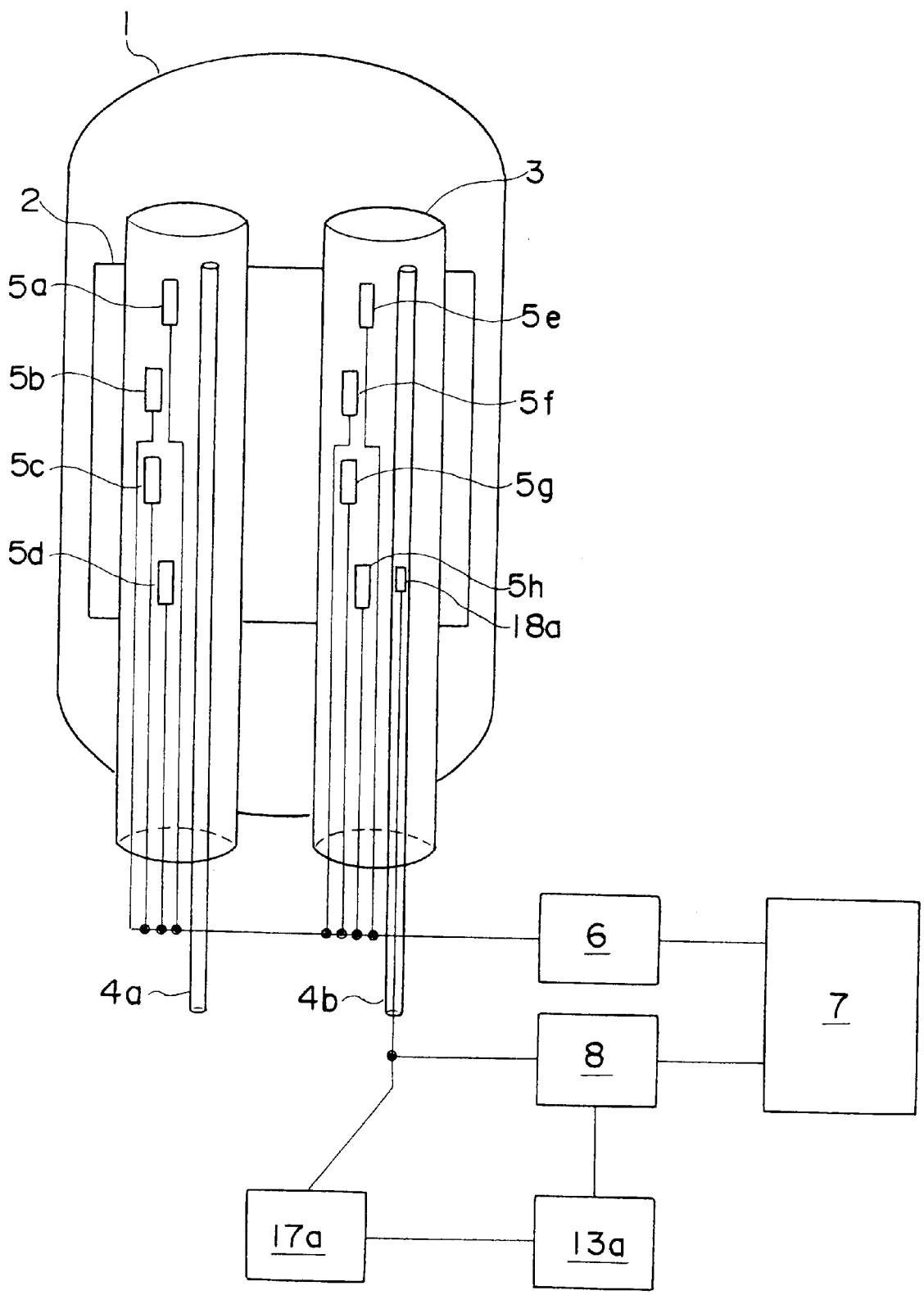
FIG. 1 is a block diagram of the reactor power output measurement device according to an embodiment of the present invention.

FIG. 1 is a block diagram of the reactor power output measurement device according to an embodiment of the present invention. In FIG. 1, a reactor core 2 of a reactor 1 is installed with a plurality of LPRM detector assemblies 3 in a number corresponding to the reactor power output. For example, in a nuclear power plant of 1100 MWe class, forty-three LPRM detector assemblies 3 are provided. One LPRM detector assembly 3 contains LPRM detectors 5a, 5b, 5c, and 5d and LPRM detectors 5e, 5f, 5g, and 5h, respectively. The LPRM detector assembly 3 is provided with guide tubes 4a, 4b for inserting the TIP detector 18a. One TIP detector drive system 17a for driving the TIP detector 18a is installed for every ten LPRM detector assemblies. Therefore, in a nuclear power plant of 1100 MWe class, five TIP detector drive systems 17a, 17b, 17c, 17d and 17e are installed, as is shown in FIG. 2.

A neutron flux measured by the TIP detector 18a is calculated at a TIP integrated controller 8, and is input to a process computer 7. Also, the neutron flux measured by the LPRM detector 5a of the LPRM detector assembly 3 is calculated at a LPRM 6, and is input to a process computer 7. The output of the TIP integrated controller 8 is input to a TIP drive controller 13a. The output of the TIP drive controller 13a operates the TIP detector drive system 17a, and drives the TIP detector 18a.

Figure 2:
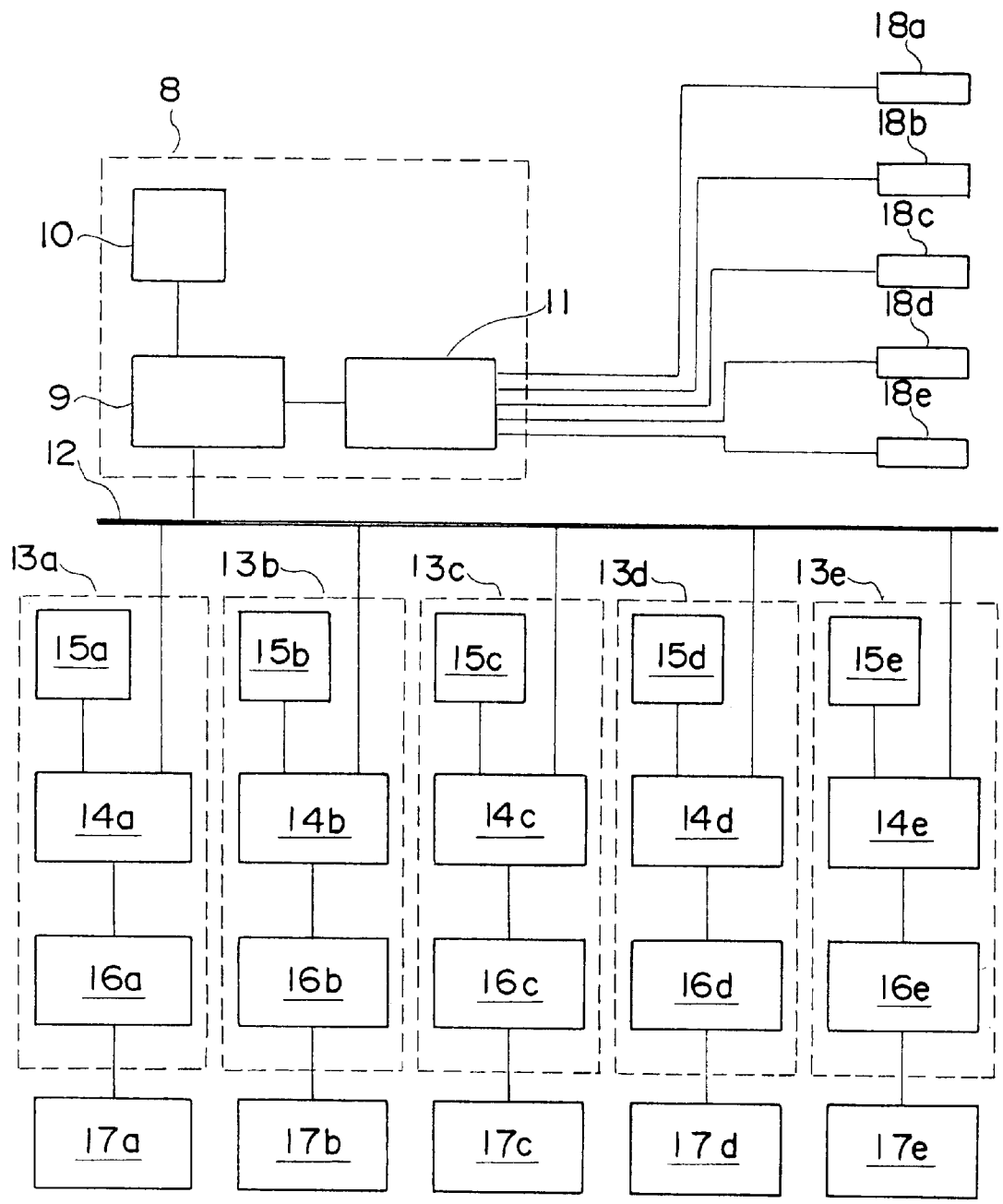
FIG. 2 is a block diagram of the overall system of the present invention.

FIG. 2 shows the structure of the overall system of the present embodiment.

The TIP detector drive system 17a is connected to a drive control device 14a via a signal cable and a drive unit input/output device 16a, and is controlled by the control signal of the drive control device 14a. A drive unit operation/monitor device 15a for operating/monitoring the drive control device 14a, such as a flat display and the like, is connected to the drive control device 14a. The drive control device 14a, the drive unit operation/monitor device 15a, and the drive unit input/output device 16a constitute the TIP drive controller 13a. The same structure applies to other TIP drive controllers 13b through 13e.

The TIP drive controllers 13a through 13e are connected to an integrated control device 9 via a transmission path 12 such as an optical transmission and the like. The integrated control device 9 transmits the control data to all of the TIP drive control devices 13a through 13e, and controls and monitors all of the detector drive system. An integrated unit operation/monitor device 10, such as a flat display and the like, is connected to the integrated control device 9, and operates/monitors the integrated control device 9. The detector signal obtained from the TIP detector 18a is input to the integrated control device 9 via a signal cable and an integrated unit input/output device 11. The signals obtained from the TIP detectors 18b through 18e are also input to the integrated control device 9 via the integrated unit input/output device 11. The integrated control device 9, the integrated unit operation/monitor device 10, the integrated unit input/output device 11 constitute a TIP integrated controller 8.

Figure 3:
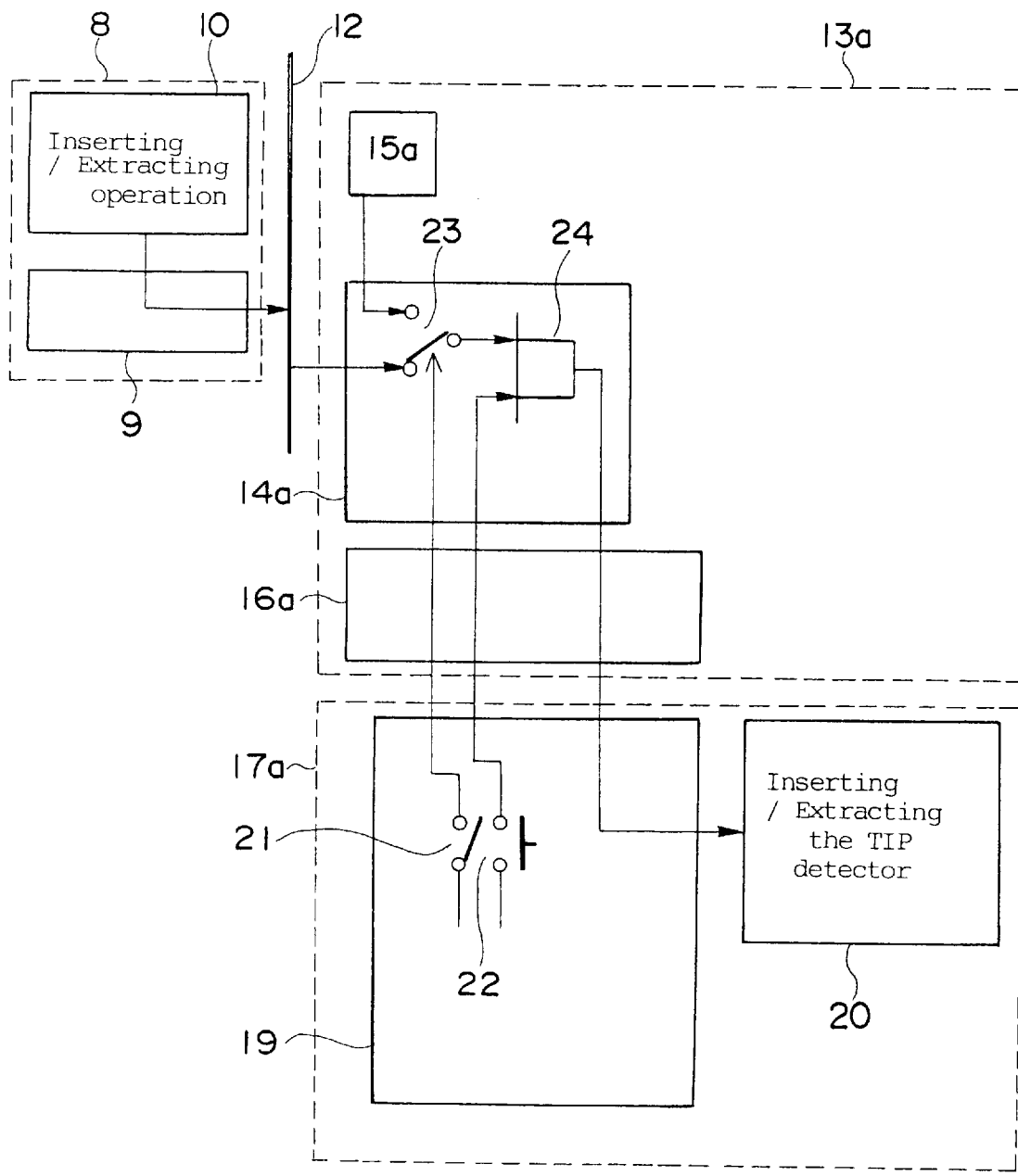
FIG. 3 is an explanatory view of the backup operation of the present invention.

The backup operation of the present embodiment will be described below with reference to FIG. 3. In FIG. 3, the drive control device 14a is equipped with an operation/monitor device switching circuit 23 and a logic circuit 24, and the TIP detector drive system 17a is equipped with an interlock circuit 19 including an operation-switching switch 21 and an operation-authorizing switch 22, and a detector drive system driver 20.

When conducting inserting/extracting operation of the TIP detector with the drive unit operation/monitor device 15a of the TIP controller 13a, the inserting/extracting command output from the drive unit operation/monitor device 15a is input to the drive control device 14a. Under the normal condition, the operation/monitor device switching circuit 23 is input with the signal from the drive unit operation/monitor device 15a side. When the AND condition is established by the logic circuit 24 from the inserting/extracting command and the operation-authorizing switch 22 provided to the interlock circuit 19, the inserting/extracting command is input to the TIP detector drive system 17a through the drive unit input/output device 16a. The inserting/extracting command input to the TIP detector drive system 17a is input to the detector drive system driver 20 via the interlock inside the interlock circuit 19, and carries out inserting/extracting operation of the TIP detector 18a.

When only the drive unit operation/monitor system 15a of the TIP drive controller 13a suffers from failure, the driving of the TIP is continued with the process mentioned hereinbelow, to backup the same. It is detected by the self-diagnosis function whether the device has failed or not. Also, the integrated unit operation/monitor device 10 displays the same screen as the drive unit operation/monitor device 15a under the normal condition.

When the failure of the drive unit operation/monitor device 15a is detected with the self-diagnosis function, the operator operates the operation-switching switch 21 provided to the interlock circuit 19. With such operation, the operation/monitor device switching circuit 23 switches from the drive unit operation/monitor device 15a side to the TIP integrated controller 8 side. At the same time, the inserting/extracting operation command is output from the integrated unit operation/monitor device 10. The inserting/extracting operation command output from the integrated unit operation/monitor device 10 is input to the drive control device 14a via the integrated control device 9 and the transmission path 12, and is input to the TIP detector drive system 17a via the drive unit input/output device 16a when the AND condition is established by the logic circuit with the operation-authorizing switch 22, as is in the case where the command is output from the drive unit operation/monitor device 15a under the normal condition. Next, the command is input to the detector drive system driver 20 via the interlock inside the interlock circuit 19, and the detector drive system driver 20 carries out the extracting operation of the TIP detector 18a.

As is mentioned above, when the drive unit operation/monitor device 15a suffers from failure, the present embodiment continues the TIP drive with the backup by the TIP integrated controller 8, as well as prevents operational error by outputting the TIP operation command output from the TIP integrated controller 8 under the condition of the operation-authorization.

Figure 4:
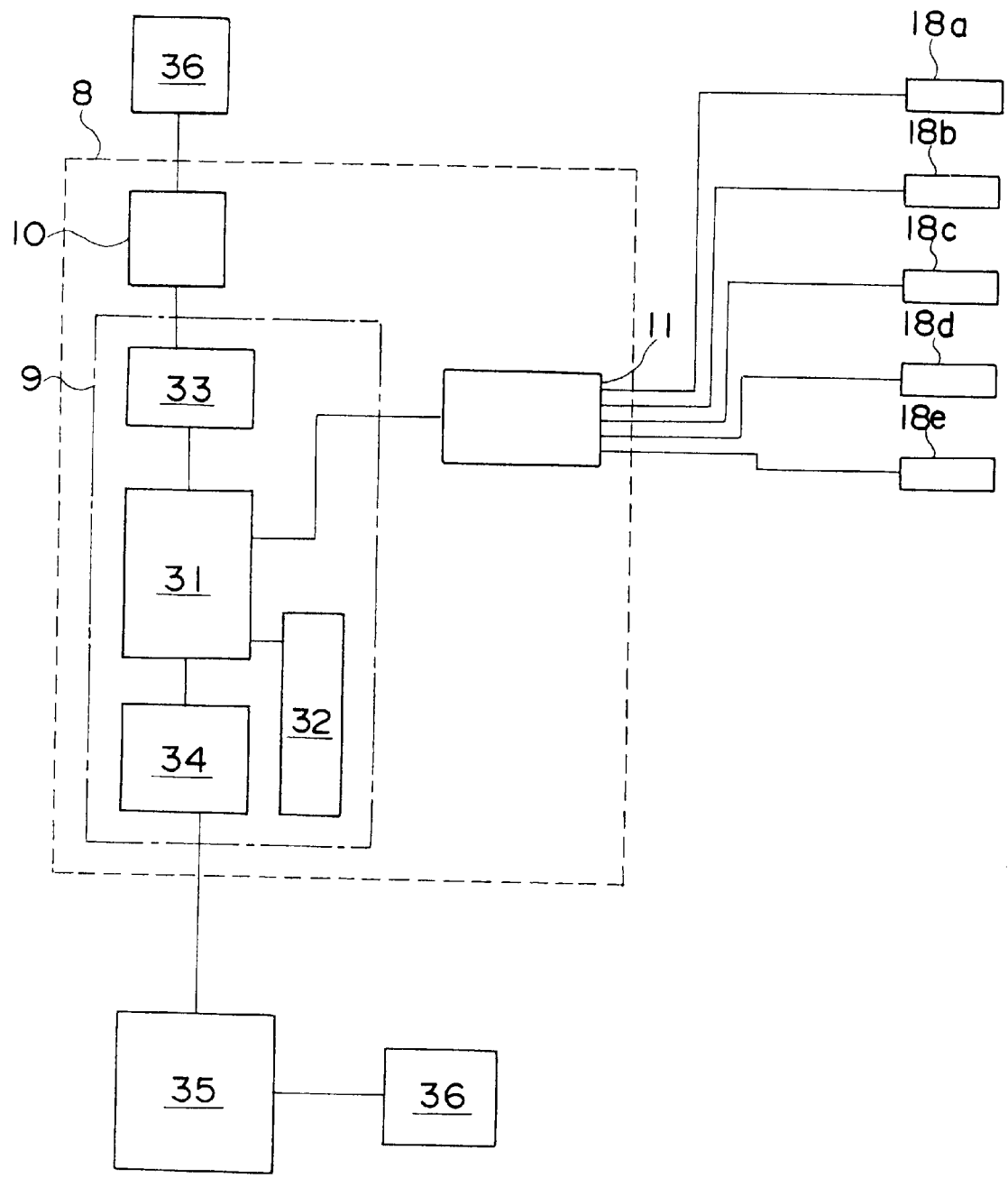
FIG. 4 is an explanatory view of the memorizing/storing/recording of the measured neutron flux data according to the present invention.

Next, the memorizing/storing/recording of the neutron flux data measured by the present embodiment will be described with reference to FIG. 4. In FIG. 4, the integrated control device 9 is equipped with a processor 31, a memory 32, an operation/monitor device arithmetic unit 33, and a communication arithmetic unit 34, and is also provided with a printer 36 connected to the integrated unit operation/monitor device 10, a data processing terminal 35 such as a personal computer and the like connected to the communication arithmetic unit 34 via a communication cable, and a printer 36 connected to the data processing terminal 35.

The neutron flux data detected by the TIP detectors 18a through 18e is input to the integrated control device 9 via the integrated unit input/output device 11 of the TIP integrated controller 8. The input neutron flux data is calculated at the processor 31, converted to a screen display signal at the operation/monitor device arithmetic unit 33, and is displayed at the screen of the integrated unit operation/monitor device 10. At this point, the data may be recorded by the printer 36 with the printout operation by the operator. Also, the neutron flux data calculated by the processor 31 is input to the memory 32 and is memorized therein. When a download commencement command is output from the integrated unit operation/monitor device 10, the download commencement command is input to the processor 31 via the operation/monitor device arithmetic unit 33. The neutron flux data memorized in the memory 32 is read out from the memory 32 by the processor 31, and is converted to a communication data by the communication arithmetic unit 34. The neutron flux data converted to the communication data is input to the data processing terminal 35 via the communication cable. At the data processing terminal 35, the neutron flux data is memorized/stored as an application data operating on the data processing terminal 35.

The stored neutron flux data could be indicated on the data processing terminal 35 as is in the case with the integrated unit operation/monitor device 10. Also, the neutron flux data stored in the data processing terminal 35 could be recorded by the printer 36 with the printout operation by the operator.

Figure 5:
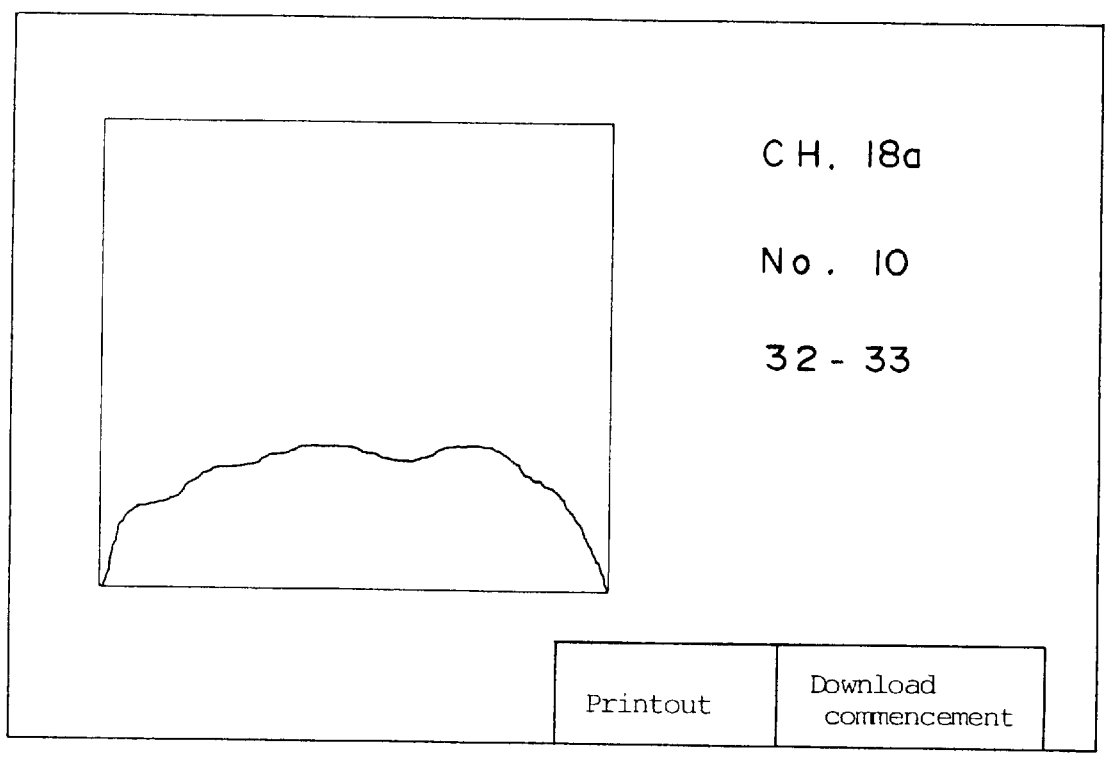
FIG. 5 is a displayed screen of the integrated unit operation/monitor device according to the present invention.

FIG. 5 indicates the display screen of the integrated unit operation/monitor device according to the present embodiment.

At the integrated unit operation/monitor device 10, the neutron flux distribution in the axial direction inside the nuclear reactor is displayed, with the positional data of the axis within the nuclear reactor taken as the x-axis, and the measured neutron flux data taken as the y-axis. In the figure, CH. 18a represents the TIP detector 18a, No. 10 represents the LPRM No. 10, and 32–33 represents the position of the LPRM No. 10 inside the nuclear reactor.

By operating the printout of the displayed screen, the neutron flux distribution in the axial direction inside the nuclear reactor is recorded by the printer 36. Also, by operating the download commencement, the download commencement command is input to the processor 31 via the operation/monitor device arithmetic unit 33. The measured neutron flux data is read out from the memory 32 by the processor 31, is converted to the communication data by the communication arithmetic unit 34, and is input to the data processing terminal 35 via the communication cable.

Figure 6:
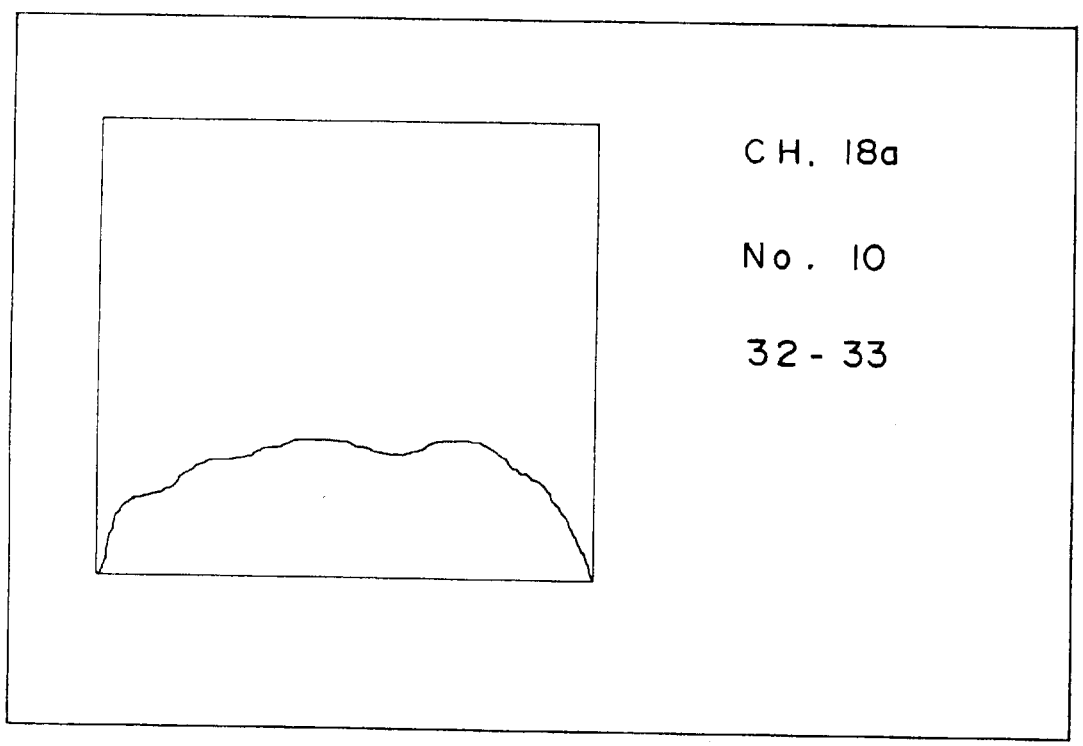
FIG. 6 is a captured screen of the data processing terminal of the present invention.

FIG. 6 indicates the captured screen of the data processing terminal according to the present embodiment.

At the data processing terminal 35, the neutron flux distribution in the axial direction inside the nuclear reactor is displayed as is in the case with the integrated unit operation/monitor device 10, with the positional data of the axis within the nuclear reactor taken as the x-axis, and the measured neutron flux data taken as the y-axis.

The measured neutron flux data is transmitted from the integrated controller 8 to the drive controller 13a via the transmission path 12.

As is explained above, according to the present invention, the operating/monitoring of the TIP with the operation/monitor device of the TIP integrated control device in a detector drive system of the traveling neutron flux detector could be continued, even when the operation/monitor device of the TIP drive controller suffers from failure. Therefore, the elongation of the plant start-up time could be prevented.

Also, with the processing by the TIP integrated controller according to the present invention, the measured neutron flux data could be memorized/stored/recorded efficiently, so that the accuracy of the reactor core performance calculation and the accuracy of the calibration of the LPRM detector could be enhanced.

We claim:

1. A reactor power output measurement device measuring a neutron flux with a traversing incore probe (TIP) traversing in a vertical direction in a core of a reactor, and calibrating a detection sensitivity of a local power range monitor based on a measured neutron flux distribution in the axial direction inside said reactor, said device comprising:
   a detector drive system for said TIP;
   a drive control unit including a drive control device and a drive unit operation/monitor means for operating and monitoring the drive control device for controlling said detector drive system; and
   a TIP integrated control unit connected to said drive control device and including an integrated unit operation/monitor means for operating and monitoring said drive control device;
   wherein operation is switched to said integrated unit operation/monitoring means when said drive unit operation/monitor means suffers a failure.

2. A reactor power output measurement device according to claim 1, wherein an operation command is output from said integrated unit operation/monitor means to said drive control device in response to an operation authorization signal output from said detector drive system of said TIP.

3. A reactor power output measurement device measuring a neutron flux with a traversing incore probe (TIP) traversing in a vertical direction in a core of a reactor, and calibrating a detection sensitivity of a local power range monitor based on a measured neutron flux distribution in the axial direction inside said reactor, said device comprising:
   a detector drive system for said TIP;
   a drive control unit including a drive control device for controlling said detector drive system, and a drive unit operation/monitor means for operating and monitoring said drive control devices;
   a TIP integrated control unit including
      an integrated control means for signal processing said measured neutron flux;
      an integrated unit operation/monitor means for monitoring processing of measured neutron flux in said integrated control means and for communicating with the detector drive system via the integrated control means, said integrated unit operation/monitor means also being connected to said drive control unit for operating and monitoring the drive controlling said detector drive system; and
      an integrated unit input/output means for inputting/outputting a neutron flux measured by said TIP;
   a data processing terminal and a printer connected to said TIP integrated control unit;
   wherein said reactor power measurement and display device displays and records said measured neutron flux and said neutron flux distribution in the axial direction inside said reactor.

4. A reactor power output measurement device according to claim 3, wherein said reactor power output measurement device includes a memory means for memorizing and storing said measured neutron flux.

5. Apparatus for calibrating detection sensitivity of a reactor power output measurement device having a local power range monitor for measuring neutron flux within said reactor, said apparatus comprising:
   a plurality of traversing incore probes (TIP's) which traverse a core of said reactor, for measuring neutron flux within said core;
   a plurality of detector drive systems for moving said TIPS, one detector drive system being provided for each TIP;
   a plurality of drive control units, one drive control unit being associated with each detector drive system, each of said drive control units including a drive control device and a drive unit operation/monitoring means for operating and monitoring said drive control device; and
   a unified central control unit, including a unified central control device for providing control data to each of said drive control devices and a unified central unit operation/monitor means for operating and monitoring the unified central control device;
   wherein, in response to a failure of the drive unit operation/monitoring means in a drive control unit, operation and monitoring of the drive control device of the said drive control unit is switchable to said unified central unit operation/monitor device.

* * * * *

UNITED STATES PATENT AND TRADEMARK OFFICE
CERTIFICATE OF CORRECTION

PATENT NO.     : 6,633,622 B2
DATED          : October 14, 2003
INVENTOR(S)    : Takuya Kuribayashi et al.

It is certified that error appears in the above-identified patent and that said Letters Patent is hereby corrected as shown below:

<u>Title page,</u>
Item [75], Inventors, should read -- Takuya Kuribayashi et al. --

Signed and Sealed this

Sixteenth Day of March, 2004

JON W. DUDAS
*Acting Director of the United States Patent and Trademark Office*